Dec. 3, 1968   M. W. KOLZE   3,414,142
SWEEP ARM BIN UNLOADER
Filed May 9, 1967   2 Sheets-Sheet 1

INVENTOR.
Melvin W. Kolze
BY Hill, Sherman, Meroni, Gross + Simpson
ATTORNEYS

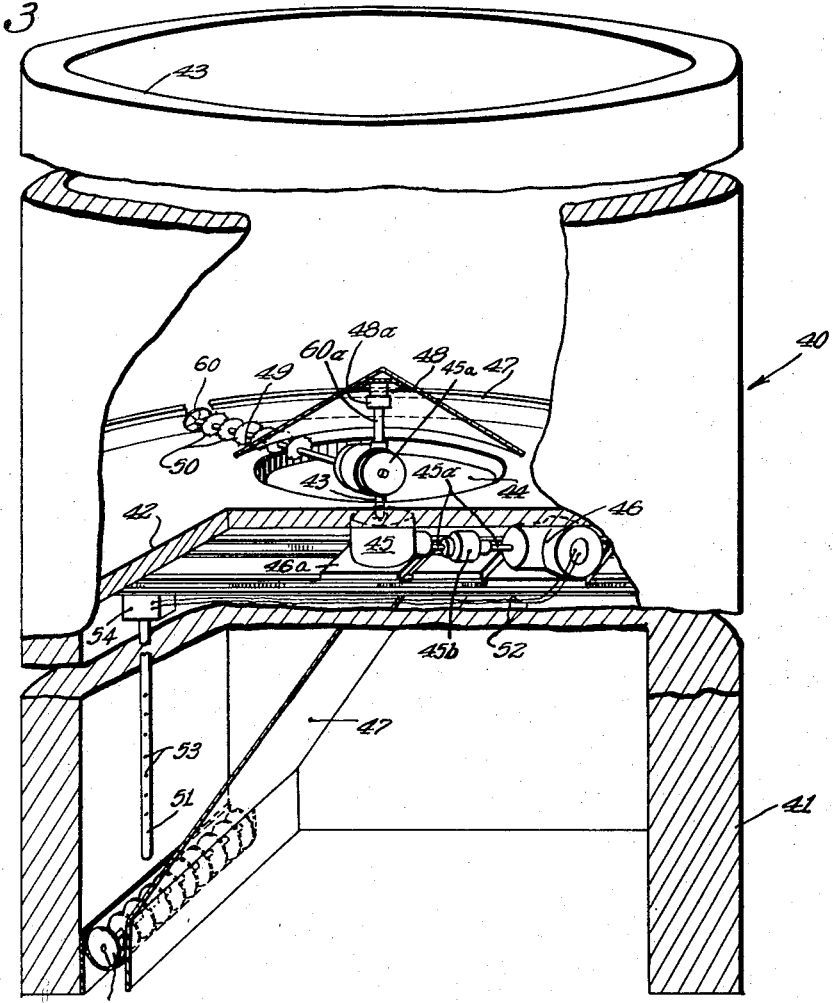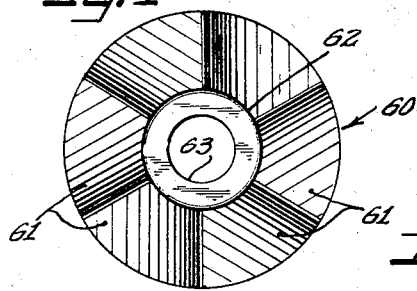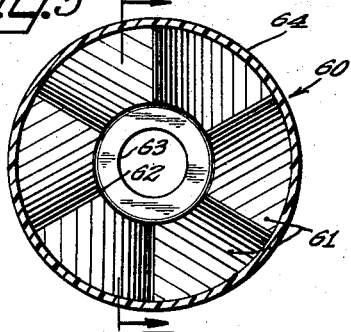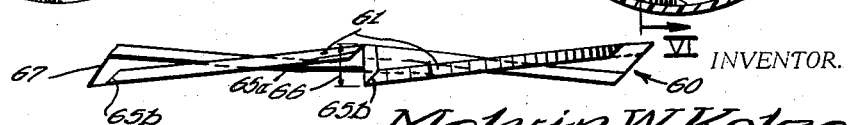

United States Patent Office 3,414,142
Patented Dec. 3, 1968

3,414,142
SWEEP ARM BIN UNLOADER
Melvin W. Kolze, 1011 Thomas,
Forest Park, Ill. 60130
Continuation-in-part of application Ser. No. 435,223,
Feb. 25, 1965. This application May 9, 1967, Ser.
No. 637,196
7 Claims. (Cl. 214—17)

ABSTRACT OF THE DISCLOSURE

A bottom unloading free sweeping conveyor screw mechanism for a storage bin with an impeller-wheel member at the outer end of the conveyor screw in working relationship with a retaining track attached to the side walls of the container to maintain the screw in generally parallel relationship with the bottom of the container. A flow-control plate freely rotating above the bottom opening of the container to prevent the particulate material from flowing by gravity out of the container and a separate control means regulating the actual rate of unloading.

CROSS REFERENCE TO RELATED APPLICATION

This is a continuation-in-part application of my co-pending application Ser. No. 435,223, filed Feb. 25, 1965, now Patent No. 3,338,434.

BACKGROUND OF THE INVENTION

Field of the invention

This invention relates to an unloading mechanism and more particularly to a bottom unloading mechanism useful for unloading particulate material from various storage containers.

Description of the prior art

With certain particulate materials it is general practice to remove the particulate material from storage containers on a first-in, first-out basis. However, particulate material such as sawdust, wood chips, hogged bark, tan bark, flour, etc. are normally stored in relatively large containers, tanks, bins, or the like, wherein they tend to agglomerate, etc. so as to resist flow from the container by means of gravity, thereby requiring various unloading mechanisms. Certain bottom unloaders presently employed use conveyor screws having various means for positively driving the conveyor screw around the container bottom. A reoccurring and difficult problem with this type screw unloader is the arcing and/or breaking of the conveyor screw shaft as it is moved through the particulate material being unloaded. When a conveyor screw is simultaneously rotated about its longitudinal axis and driven about the bottom of the bin, there is a natural tendency of the conveyor screw to "climb" into the pile of particulate material being unloaded so as to bend its own shaft upwardly. Further, the various positive drive means employed with such conveyor screws tend to hinder efficient operation as they force the conveyor screw to move through the material even though the demand of the screw has already been met and in other instances where there is a sparsity of particulate material a great delay is encountered until the drive means properly positions the conveyor screw for operation.

SUMMARY OF THE INVENTION

It is, therefore, an important object of the present invention to provide a relatively simple bottom unloading mechanism utilizing a conveyor screw that is free sweeping.

It is another object of the invention to provide a relatively economical bottom unloading mechanism utilizing a conveyor screw wherein the screw shaft remains substantially parallel to the bottom of the container throughout the operation thereof.

It is a further object of the invention to provide a bottom unloading mechanism which uniformly removes material from the entire bottom surface of the container including the extreme peripheries thereof, without bending, breaking or jamming such unloading mechanism.

It is still a further object of the invention to provide a bottom unloading mechanism wherein the rate of unloading is readily controlled.

Other and further objects, features and advantages of the present invention will become more apparent to those skilled in the art from the following detailed disclosure and the drawings attached hereto, in which preferred structural embodiments incorporating the principles of the instant invention are shown by way of illustrative example only.

BRIEF DESCRIPTION OF THE DRAWINGS

FIGURE 3 is a partial perspective view, with parts broken away, showing yet another embodiment of the instant invention;

FIGURE 4 is a top plan view of the outer end portion of the bottom unloading mechanism in accordance with the principles of the instant invention;

FIGURE 5 is a top plan view of a modified form of the outer end portion as shown in FIGURE 4; and FIGURE 6 is an elevational view taken substantially along line VI—VI of FIGURE 5 showing additional details of the outer end of the bottom unloading mechanism.

DESCRIPTION OF THE PREFERRED
EMBODIMENTS

Figure 1:
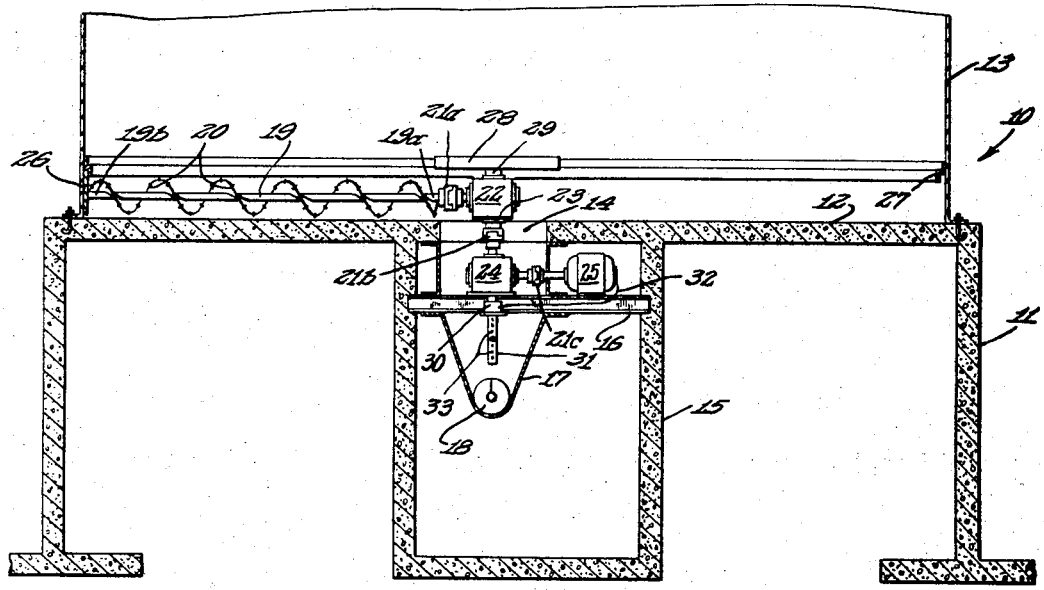
FIGURE 1 is a vertical sectional view of the bottom unloading mechanism in accordance with the principles of the instant invention.
Figure 2:
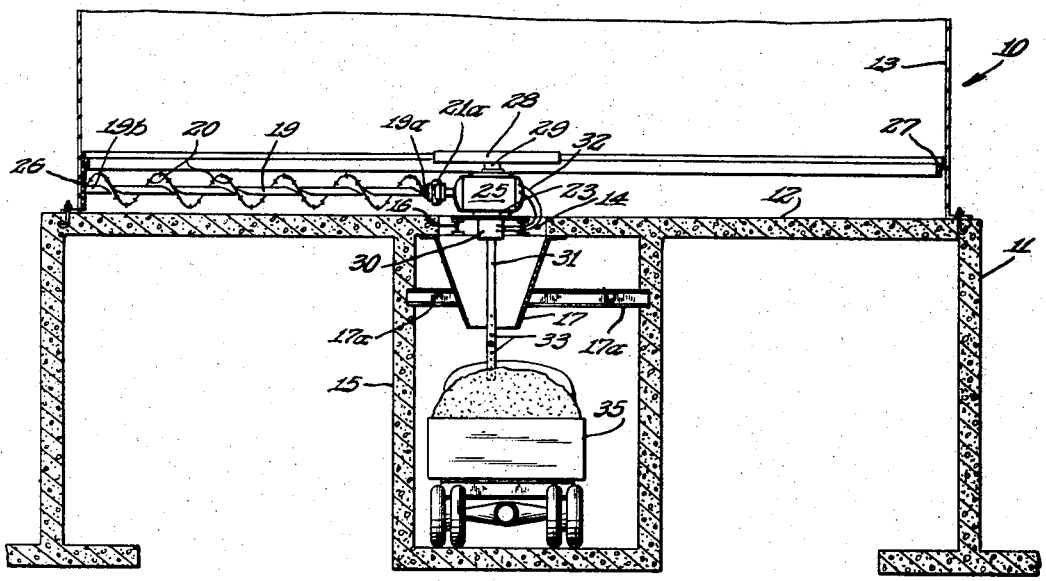
FIGURE 2 is a vertical sectional view of a modified form of a bottom unloading mechanism in accordance with the principles of the instant invention.

As shown in FIGURES 1 and 2, wherein similar parts have the same reference numerals, a container 10, which may be cylindrical in shape, is provided with a support foundation 11. The foundation 11 has a bottom 12 which is provided with a central opening 14, which may be circular in shape and opens into a sub-foundation area. The sub-foundation area is defined by sub-foundation walls 15 which extend beneath the floor 12 a suitable distance to accommodate the central chute 17. The chute 17 is generally formed of metal sheet which is attached to the floor 12 and to a support beam 16 within the sub-foundation walls 15. Chute 17 is shown at FIGURE 1 in the form of an inverted cone, having its base generally commensurate with the diameter of the central opening 14. Chute 17 terminates at a lower off-center conveyor screw 18 (which is more fully described in U.S. Patent No. 2,723,021, which disclosure is incorporated herein by reference), for transporting the particulate material to a further desired location. The container also has side walls 13 extending upwardly from the foundation 11 and suitably attached thereto.

As will be appreciated, particulate material such as sawdust, wood chips, bour, etc., is loaded into a suitable storage container 10, which may be of substantial height, through the top and generally uniformly fills the entire container from top to bottom. The particulate material is then moved to the central opening 14 and falls therethrough into the chute 17 to an accumulation point to facilitate the unloading of the material. In order to move the material through the central opening, a bottom unloading means is provided. The bottom unloading means is preferably in the form of an upper conveyor screw 19, which lies in a generally parallel plane to the bottom 12 in working relationship thereto and extends substantially from the central opening 14 to the side walls 13. While in the embodiment of the invention illustrated, a single conveyor screw 11 is shown, it will nevertheless be appreciated that it is within the scope of the invention to utilize two or more similarly disposed conveyor screws. In the preferred embodiments of the invention, however, it is preferred to employ a single conveyor screw because of the economic considerations and also the fact that in most applications, sufficient capacity is obtained therefrom, for example, in certain instances, 30 tons per hour can be unloaded with a single conveyor screw.

As may be seen from the drawings, upper conveyor screw 19 has an inner end 19a positioned adjacent the central opening 14 and an outer end 19b positioned adjacent the side walls 13. The inner end of the conveyor screw 19 is coupled by means of an appropriate coupler 21a to an upper beveled gear box housing 22 which has a radial thrust bearing 23, diagrammatically shown, supporting the weight of gear housing 22 upon the shoulders of coupler 21b. Coupler 21b connects the output shaft of a lower beveled gear box housing 24 (which is attached to support beam 16) with the input shaft of upper bevel gear box housing 22. The radial thrust bearing 23 is thus capable of supporting the weight of gear box 22 while allowing it to freely rotate in a plane substantially normal to the axis of the conveyor screw 19. As will be appreciated, such rotation of the gear box 22 is caused by the torque imparted to it by the rotation of conveyor screw 19 about its own axis. In other words, the bearing 23 allows rotational or sweeping movement by the conveyor screw 19 about a vertical axis in a plane which is substantially parallel to the bottom 12 of the container 10.

A suitable power supply source 25, generally in the form of an electric motor is suitably mounted on support beam 16 and is attached by means of coupler 21c to the lower gear box 24, which may include reduction gears and bevel gears. Preferably the direction of rotation of the conveyor screw 19 is the same as the direction of the sweep motion of the conveyor screw and the same as the direction of the flutes of the conveyor screw. In other words, when the conveyor screw is rotated in a right-hand direction, it is preferably rotating about the container in a right-hand direction and has right-handed flutes. Of course, a left-hand direction is also suitable as long as the direction of conveyor rotation is the same as the flute direction. This alignment prevents "shock" loading which can otherwise occur when a conveyor screw suddenly encounters a relatively large pile of material while sweeping at a fairly high speed. With proper alignment, the screw will sweep up against a pile of material and chew its way therethrough, without overloading itself or bending in a horizontal direction, since the flutes pick up material on the downward portion of their rotational cycle and move the material downward and toward the center opening, thereby moving only a controlled amount of material. However, if the direction of the sweep is opposed to the flute direction, then the flutes pick up the material on the upward portion of their rotational cycle in an attempt to move the material upward and toward the central opening and thereby subject the conveyor screw shaft to a substantial downward pressure, which in conjunction with the torque input causes a horizontal bending of the conveyor shaft which is, of course, undesirable. However, as previously set forth, this problem is avoided by proper alignment of the flutes with the direction of the sweep.

The upper conveyor screw 19 is provided with a central shaft, having a preferred diameter of 2 to 5 inches and composed of steel. Attached in a serpentine fashion around the periphery of the center shaft are flutes with the diameter of 1.5 to 5 times the diameter of the shaft. Agitators or teeth 20 are provided on the entire periphery of the flutes so as to be substantially perpendicular to the outermost edge of the flutes and thereby "bite" into the particulate material being unloaded. Teeth 20 are generally 0.25 to 2.25 inches in length and 0.25 to 1.5 inches in width and may be fastened to the flutes by any desired means, as for example, welding.

Attached to the outer end 19b of the conveyor screw shaft is an impeller-wheel 26, which is in close running relationship with the side walls 13 of the container 10. The impeller-wheel 26 is secured coaxially to the outer end of the screw shaft so as to become an integral unit therewith. Any suitable means of attachment may be employed, as for example, welding or the like. In the preferred embodiments, the impeller-wheel 26 has a diameter which is generally from 2 to 4 inches greater than the diameter of the conveyor screw (measured from the outermost edges of the flutes). This relationship of conveyor screw diameter to impeller-wheel diameter allows the flutes and agitators to sufficiently clear the container floor 12, thereby preventing undue wear of the container floor and of the conveyor flutes and agitators, while continuously moving the stored material toward the central opening.

An annular guide track or restraining bar 27 is secured to the side walls 13 continuously above the path of movement of the impeller-wheel 26. The annular guide track 27 has a working face in close working relationship to the periphery of the impeller-wheel. The annular guide track 27, which is shown in the form of a Z-bar (although angle iron or the like may also be used) prevents the impeller-wheel 26 from climbing upwardly into the particulate material. Of course, the conveyor screw 19 is also prevented from climbing into the material as it is rigidly attached to the impeller-wheel 26. The tendency of the conveyor screw to climb upwardly appears to be due to the downward pressure exerted by the particulate material. Thus, when the screw is swept about the container and simultaneously rotated about its own axis, it tends to seek the path of least resistance, which of course, is in an upward direction. However, if the screw is allowed to climb upwardly, it necessarily bends or breaks its own shaft. The guide track 27 serves to maintain the conveyor screw in substantially parallel relationship to the bottom of the container despite the tendency of the screw to climb upward. A more detailed description of the impeller-wheel will be found in conjunction with the discussions of FIGURES 4 through 6 hereinafter.

In order to fully control the rate of unloading material in container 10, a coarse control means 28 is provided in spaced relationship above the central opening 14 to prevent the stored material from falling by gravity therethrough. The coarse control means 28 is shown in the shape of a circular plate mounted on top of upper gear housing 22, but it will be appreciated that a conical shaped member could also be utilized. The base of coarse control means 28 has a diameter greater than the diameter of the central opening 14 and thereby prevents any substantial amount of particulate material from directly escaping out of the opening. Coarse control means 28 is mounted on and supported by bearing means 29, which are mounted on the shoulder portion of the upper gear housing 22. Bearing means 29 permits the coarse control 28 to independently rotate about a vertical axis in accordance with the amount of stored material on it, i.e., when a substantial amount of material rests on the coarse control 28, it will tend to remain stationary in respect to the movement of the gear box 22 but will rotate with the gear box when little or no material rests on it. The bearing means 29 allows a substantial amount of material to be supported by the coarse control 28 without requiring additional power to rotate gear box 22 about a vertical axis. Further, the coarse control 28 also allows easy access to the drive assembly, etc., without the necessity of unloading the material from the container 10.

Suitably affixed to support beam 16 within the central opening 14 is a fine control means 30 which precisely controls the rate of unloading of the stored material. The fine control means 30 includes a vertical blade 31, which rotates about its own vertical axis in response to the energy output of the fine control. The fine control 30 comprises a conventional small electric shaded pole motor equipped with a centrifugal switch operationally communicating through wires 32 to drive motor 25. In operation, when the stored material reaches a level within chute 17 sufficient to engage the outer end of the vertical blade 31 and thereby preventing further rotation of the blade 31, the centrifugal switch shuts off the energy input to drive motor 25 preventing further rotation of the conveyor screw 19. When the level of material recedes below the blade 31, allowing the blade to begin rotating once more, the centrifugal switch reactivates drive motor 25 and conveyor screw 19 starts rotating to draw material toward opening 14. The vertical blade 31 is provided with a plurality of holes 33 to allow adjustment along the length of the blade by means of a pin arrangement or the like in accordance with the desired amount of material to be unloaded. The vertical blade 31 allows exceptional operational features not available with other types of control mechanisms, as for example, conventional paddle wheels, since the particulate material engages only the outer end of the vertical blade 31 and does not engage the entire face of the blade as with a paddle wheel arrangement. As will be appreciated, with a paddle wheel arrangement, the horizontal blade face periodically becomes covered with the material, preventing further rotation of the blade and requiring an operator to manually dislodge this material from the horizontal blade in order to insure the continuous operation of the unloading mechanism. However, with a vertical blade, such as 31, the above difficulties are avoided.

Referring now to FIGURE 2, wherein a modified embodiment of the invention is shown, it will be noted that the parts similar to those described in FIGURE 1, have the same reference numerals. It will be noted that the unloading mechanism is substantially similar to that described in conjunction with FIGURE 1, with the drive assembly 25 thereof and the chute 17 being somewhat modified. In the center opening 14 (within a similar container to that described in FIGURE 1) there is provided a support means 16 upon which is suitably attached a bearing means 23. Bearing means 23 supports the drive motor 25 which is connected by means of a coupler 21a to the inner end 19a of a conveyor screw 19.

The chute 17 is provided with converging walls having auxiliary support means 17a to maintain the relative position and to direct the unloading material to the desired location, as for example, a truck bed 35. The coarse and fine controls 28 and 30, respectively, are substantially the same as described in conjunction with FIGURE 1. Of course, the conveyor screw 19, agitators 20, impeller-wheel 26 and guide track 27 are also similar to their corresponding parts in FIGURE 1. In the arrangement of FIGURE 2, the conveyor screw 19 can be caused to rotate and sweep at a much faster speed, i.e., with no reduction of power output from the drive motor 25. Of course, there is no need for any gears to either reduce speed of rotation or to transmit the rotational force through an angle.

FIGURE 3 illustrates another form of the invention. A storage container 40 is provided with a foundation 41 having a floor 42 and extending thereabove side walls 43. The floor 42 has a central opening 44 which communicates with a sloping chute 47 terminating at any desired location, including a lower conveyor screw 48. A support means 46a (as in the form of I-beam) is provided within the central opening 44 to support a lower beveled gear housing 45 and a drive motor 46. The beveled gear housing 45 is connected to motor 46 by means of coupler 45a and an intermediate gear housing 45b. Surrounding the output shaft of gear housing 45 are bearing means 43 which support an upper gear housing 45a. A conveyor screw 49 is connected by means of a coupler (not shown) to the output shaft of the upper gear housing 45a and driven thereby. The conveyor screw 49 substantially extends from the approximate center of the container 40 to the annular side walls 43 and is provided with normally extending agitators 50 at the periphery of its flutes.

Rigidly and coaxially attached to the outer end of the conveyor screw 49, in close running relationship to the side walls 43, is an impeller-wheel 60 which is capable of rolling about an annular edge of the container 40 due to frictional engagement with the floor 42 and to continuously impel material from the edges of the container toward the center. The impeller-wheel 60 is of such diameter as to allow the conveyor screw 49 to remain out of contact with the bottom 42. An annular guide track 47 is attached to the side walls 43 and has a face in working relationship to the peripheral edge of the impeller-wheel 60 to prevent the impeller-wheel 60 and conveyor screw 49 from ascending into the material stored in container 40. A coarse control means 48, in the form of a cone having a base diameter somewhat larger than the diameter of opening 44, is supported on a shaft 60a by appropriate bearing means 48a on the top of the upper gear housing 45a to prevent the stored material from feerly escaping through the opening 44. Attached below the floor 42, directly above the accumulation point of chute 47, is a fine control means 54, which is substantially similar to fine control means 30 discussed in conjunction with FIGURES 1 and 2, and is provided with a vertical blade 51 having elongation adjustment means 53 and communicating means 52 directly attached to the drive motor 46 to regulate the energy input thereto in a similar manner as described in conjunction with FIGURES 1 and 2.

FIGURES 4, 5 and 6 show certain additional details of an impeller-wheel 60 usable with a conveyor screw in accordance with the principles of the instant invention. Impeller-wheel 60 is circular in form and may be formed from 0.125 to 0.50 steel plate stock. The impeller-wheel 60 is divided into four to eight equal impeller-blades 61 which extend from reinforcement ring 62 to the outer periphery of the impeller-wheel 60. Joining ring 63 has a diameter substantially equal to the shaft of the conveyor screw and is generally in the range of 2 to 5 inches. Reinforcement ring 62 generally extends 1 to 3 inches beyond the periphery of the joining ring 63 and provides added stiffness to each of the impeller-blades 61.

The impeller-blades 61 are generally formed by cutting, as with an acetylene torch, or the like, along a path radially inwardly from the periphery of the impeller-wheel 60 to the outer edge of the reinforcement ring 62. Preferably, the cut is made at an angle in the range of 5° to 75° to the plane of the impeller-wheel 60. Cutting at such an angle provides leading edges 65a and 65b on the impeller-blades 61. The impeller-blades 61 are all twisted in the same direction (i.e., right-handed or left-handed) as the direction of the flutes on the conveyor screw, and are out of the plane of the reinforcement ring 62 so that the ends of the impeller-blades are vertically separated a distance 66 apart, which distance is in the approximate range of 0.5 to 3.5 inches. This arrangement of impeller-blades allows them to present a substantially continuous rotary surface to the bottom 42 of the container 40 with the blade portion 61 being spaced apart a distance 66 sufficient to allow the plurality of leading edges 65a, 65b, etc. to be in close running relationship with the side walls of the container beneath the guide track 47 and clear away any material along the lower periphery thereof toward the center of the container. It will be noted that there is no open area between the blades so that they are substantially coextensive with the impeller-wheel. When less blades or leading edges are used, serious difficulties are encountered as insufficient material is moved from beneath the guide track, thereby causing jamming of the mechanism. Further, when the blades are spaced a substantially greater vertical distance apart, overloading occurs; and where an open area is provided between the side peripheries of the blades, sporadic rotation is encountered with excessive shock and roughness being transmitted to the conveyor mechanism.

In order to reduce frictional wear on the impeller-wheel 60 an outer edge 64 of an elastomeric material may be suitably bonded thereto prior to the cutting of the impeller-blade 61. The preferred material for this use is polyurethane, as it bonds well to small areas of steel and has a remarkable wearing quality. The bonding of such material to steel is well known in the art and need not be described further.

It will thus be seen that in accordance with the invention, means are provided for unloading a container from the bottom thereof, utilizing a rotating free sweeping conveyor screw, which is substantially parallel with the bottom of the container. An impeller-wheel member is rigidly attached to the outer end of the conveyor screw in close proximity to the side walls of the container, to not only clear away any material along the side walls but to also, in cooperation with an annular guide track thereabove, prevent the conveyor screw from ascending upwardly. In addition, coarse and fine control means are provided to control the rate of discharge of the material from the container.

It will be understood, of course, that modifications and variations may be effected without departing from the spirit and scope of the novel concepts of the present invention.

I claim as my invention:

1. A mechanism adapted for unloading particulate material from a container through a central opening in the bottom thereof, a free sweeping conveying means extending laterally of the central opening in operative relationship to the bottom substantially to a side wall of the container and in generally parallel relationship to the bottom, a freely rotating deflector means positioned above the central opening in working relationship thereto, electromotive drive means connected to the conveying means rotating the conveying means about its longitudinal axis, a single-centered impeller-wheel coaxially secured to the outer end of the conveying means in frictional contact with the bottom, the impeller-wheel continuously moving material from the bottom peripheral edges of said container toward the central opening, restraining means in working relationship with the impeller-wheel preventing the conveying means from ascending into the particulate material, and rotatable control means within the central opening extending downwardly therefrom determining the accumulated particulate material beneath the central opening and controlling energy input to said electromotive drive means in response to the accmumulation of material, whereby said drive means rotates said conveying means about its longitudinal axis causing frictional engagement of said impeller-wheel with said bottom thereby sweeping said conveying means about said container and uniformly unloading said particulate material from said container at a desired rate.

2. A mechanism in accordance with claim 1, including an electromotive control means having a rotating longitudinally extending narrow blade member elongated downwardly beneath the central opening of the container to a particulate material accumulation point, said control means communicating with the electromotive drive means controlling energy input thereto in response to the particulate material around said blade member.

3. A mechanism in accordance with claim 2, wherein the vertically extending blade member has adjustment means for varying the extent of its elongation.

4. A mechanism in accordance with claim 1, wherein the impeller-wheel is provided with four to eight substantially uniform blades, said blades having leading and trailing edges at an acute angle to the plane of the impeller-wheel presenting a substantially continuous rotary surface to the bottom of the container.

5. A mechanism in accordance with claim 4, wherein the impeller-wheel blades have an outer peripheral edge composed of a wear-resistant elastomeric material.

6. A mechanism in accordance with claim 4, wherein the impeller-wheel blades are substanitally coextensive with the impeller-wheel.

7. In a cylindrical container adapted to receive particulate material through the top thereof and be unloaded through a central opening in the bottom thereof, a freely rotatable deflector means positioned above said central opening and in working relationship therewith, an annular restraining track attached to the side walls of said container and presenting a working face toward the bottom of said container, a conveyor screw in working relationship to the bottom and out of contact therewith extending laterally from the central opening in generally parallel relationship to the bottom of said container substantially to the side walls thereof, a plurality of agitators attached to the outer periphery of said conveyor screw, a single-centered multi-edged impeller-wheel having a discontinuous peripheral surface defining a continuous rotary surface coaxially connected at its center to said conveyor screws at its outer end, said discontinuous peripheral surface of the impeller-wheel being in frictional contact with the bottom of said conveyor and in working relationship to said annular restraining track, electromotive drive means connected to the inner end of said conveyor screw for rotating said conveyor screw about its axis, bearing means between the drive means and the conveyor screw allowing substantially simultaneously rotation and sweep by said conveyor screw, and a control means having a rotating vertical blade extending below said central opening, said control means communicating with said drive means and being responsive to the flow of particulate material through the central opening.

References Cited

UNITED STATES PATENTS

| | | | |
|---|---|---|---|
| 1,274,548 | 8/1918 | Holnagel et al. | |
| 1,482,524 | 2/1924 | Robinson | 214—17 |
| 2,617,351 | 11/1952 | Graham et al. | 214—17 X |
| 2,111,663 | 3/1938 | Graemiger | 214—17 X |
| 3,064,831 | 11/1962 | Cook | 214—17 |
| 3,138,268 | 6/1964 | Buschbom | 214—17 |

ROBERT G. SHERIDAN, *Primary Examiner.*